Patented July 1, 1930

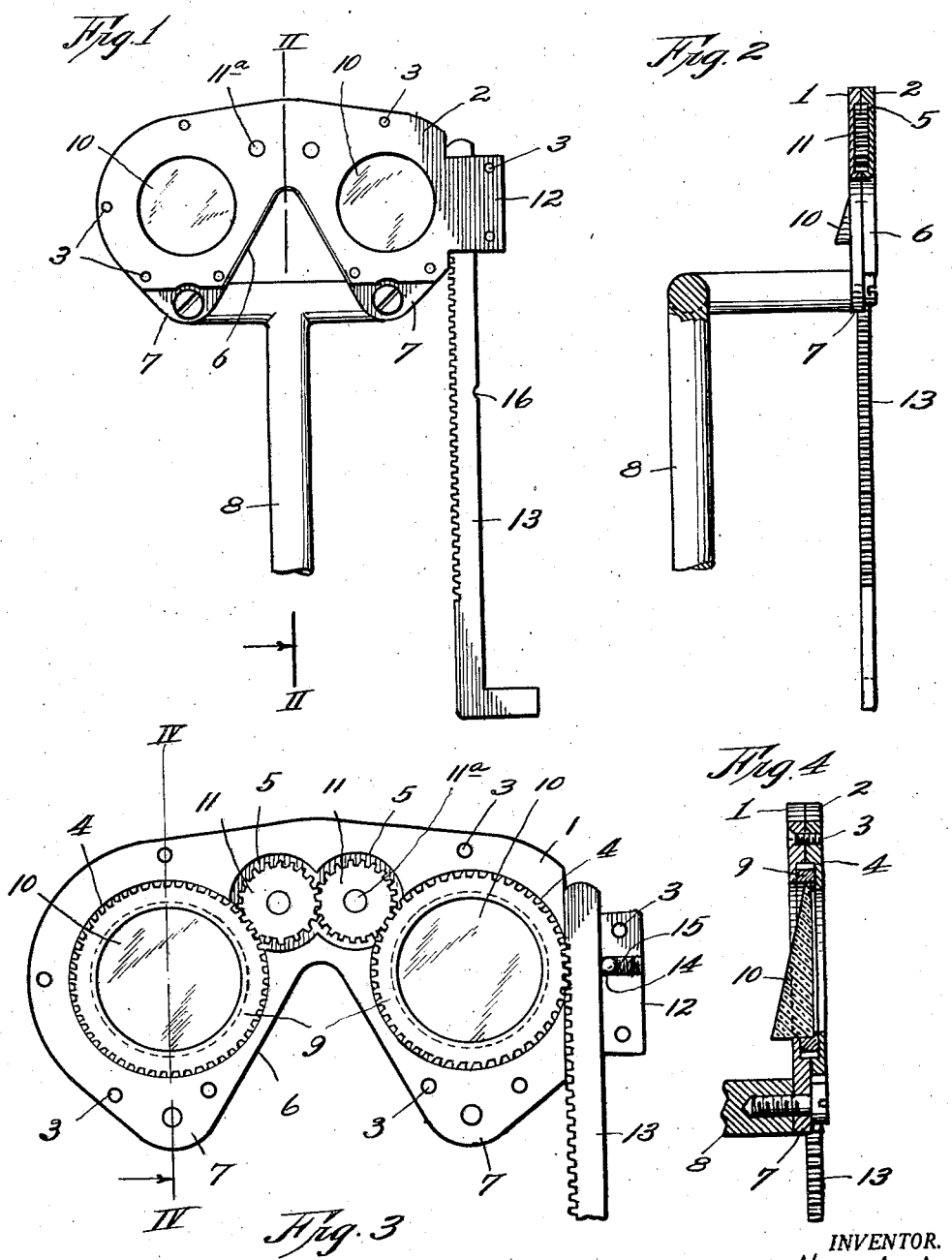

1,769,295

UNITED STATES PATENT OFFICE

JOSEPH J. KENNEBECK, OF KANSAS CITY, MISSOURI

OPTICAL INSTRUMENT

Application filed March 3, 1927. Serial No. 172,463.

This invention relates to optical instruments and has for its object to produce a device for exercising the extrinsic ocular muscles by simultaneously effecting action of similar muscles of both eyes by varying the relative position of certain lenses possessing prismatic characteristics which are placed before the eyes of the patient.

The prime object of the invention is to produce a device of this character of very simple construction which may be used in the office or may be loaned to the patient with definite instructions for the exercise of the eye muscles, it being of course understood that the patient should periodically present himself to the eye examiner for examination so the effect of the instrument may be checked and the treatment not carried beyond desirable limits.

With the general object named in view, the invention consists in certain novel and useful features of construction and organization of parts as hereinafter described and claimed; and in order that it may be fully understood, reference is to be had to the accompanying drawing, in which:

Figure 1 is an elevation of an instrument constructed in accordance with the invention.

Figure 2 is a section on the line II—II of Figure 1.

Figure 3 is an enlarged elevation of the instrument with one of the cover or frame plates removed to illustrate the drive gears.

Figure 4 is a section on the line IV—IV of Figure 3.

In the said drawing, where like reference characters identify corresponding parts in all of the figures, 1 and 2 indicate a pair of similar frame members which are adapted to be secured together by screws or the like 3. The frame members conjointly form a pair of internal chambers or recesses 4 and a pair of smaller chambers or recesses 5, said frames being also cut away to provide a nose piece 6. As a convenient method of mounting the device, the frame plate 1 is formed with a pair of extensions 7 whereby the frame may be secured to a suitable standard 8.

Rotatably received within the recesses 4 is a pair of gear teeth-equipped lense mountings 9, each of which may carry a plurality of suitable lenses so mounted as to give a prismatic effect upon their relative movement for said mountings may each carry a plurality of prisms, but preferably the mountings 9 each carry a single prism 10, said prisms preferably being both mounted with their faces up or down when they are in normal position. The gear teeth-equipped mountings 9 are interconnected by a pair of small gears 11 rotatable on shaft 11$^a$ so that the lenses shall be simultaneously turned in opposite directions upon rotation of one of the mountings 9.

As a convenient means of driving the rotatable lenses, the frame plates 1 and 2 are formed with similar extensions 12 at one of their ends and are internally recessed to provide a vertical passageway through which a rack bar 13 is adapted to slide, said rack bar being provided with teeth for driving engagement with the teeth of one of the mountings 9. The rack is preferably of such length that movement thereof for its full length will effect one complete rotation of the pair of lenses. Of course, any suitable method of rotating the lenses, such as a crank or gear may be substituted for the rack.

As it is desirable to know the exact point at which the lenses have moved a one-half revolution, the extensions 12 carry a ball detent 14 equipped with an expansion spring 15 which is adapted to frictionally enter a notch 16 formed in the back of the rack bar 13. The notch is positioned half the distance from the opposite ends of the rack teeth so that when the ball detent 14 enters the notch 16, it will not move beyond such point without additional force being applied. The operator is thereby automatically notified of the position of the rotating lenses 10, and he may then return them to initial position by reversely moving the bar 13, or may continue the upward movement of the bar, depending on the nature of the treatment required by the eyes of the patient.

With the device as illustrated in the drawing, the rack 13 being in down position and the prisms 10 being mounted bases-down, it will be evident that when the rack 13 is pushed up, the lenses 10 will rotate in opposite directions, the bases of the prisms for each eye moving out and effecting a converging of the eyes of the patient, the horizontal planes of the images produced in the eyes coinciding at all times. The eyes reach their limit of convergence when the lenses have been rotated a one-fourth revolution, at which time the bases of the prisms 10 are out. Upon continued movement of the rack bar, the eyes will approach, the horizontal planes still coinciding and at the instant the detent 14 enters the notch 16 the rack has moved half of its length and the eyes will reach normal, as the bases of the prisms will be up. As the upward movement of the rack bar 13 is continued, the eyes of the patient will commence to diverge and when the bar has moved three-fourths of its length from down position, the eyes will have diverged, the bases of the prisms 10 being at this time both in, adjacent the nose of the patient. Further upward movement of the rack 13 finally returns the eyes to normal, the vertical planes of the images of the eyes being coincident. It will be evident that the above operations will be reversed upon the downward movement of the rack. It will be apparent that if it is desired to exercise the ocular muscles controlling convergence, the patient will be instructed to operate the device from initial position of the rack bar 13 until movement is interrupted by the detent 14, and to then reverse the direction of the movement of the bar. On the contrary, should it be desired to exercise the ocular muscles controlling divergence, the patient will be instructed to use the detent 14 position as the initial position, and to operate the bar 13 from this position only, and never to utilize that portion of the rack above the detent. From a consideration of the nature of the invention it will be evident that although single prisms are illustrated, the device can readily be made to utilize double prisms, or suitable lenses so mounted as to give a prismatic effect. It is also to be pointed out that the device may be made adjustable to suit pupillary distance by merely providing it with the telescoping drive shaft interconnecting the main drive gears of the structure.

From the above description, it will be apparent that I have produced a device embodying all the features of advantage pointed out as desirable, and while I have described and claimed the preferred embodiment of the invention, it is to be understood that I reserve the right to make all changes properly falling within the spirit and scope of the appended claims.

I claim:

1. An eye exerciser comprising a frame having a pair of eye openings, lenses capable of producing a prismatic effect mounted in said openings, said lenses in initial position, being adapted to produce coincident images in the eyes of the patient, means interconnecting the lenses to simultaneously rotate them in opposite directions to effect muscular exercise of the eyes, and a stop for automatically indicating the extent of rotation in one direction.

2. An eye exerciser comprising a frame having a pair of openings, a rotatable toothed ring mounted in each of said openings, lenses carried by said rings, a rack bar enmeshed with the teeth of one of said rings, and means interconnecting said rings whereby movement imparted by said rack shall simultaneously oppositely rotate the rings.

3. An eye exerciser comprising a frame having a pair of eye openings, prismatic lenses rotatably mounted in each of said openings, driving connections interconnecting said lenses, and reciprocating means to impart rotation to one of said lenses.

In witness whereof I hereunto affix my signature.

JOSEPH J. KENNEBECK.